United States Patent
Fujii

(10) Patent No.: US 10,668,552 B2
(45) Date of Patent: Jun. 2, 2020

(54) WIRE FEED MECHANISM

(71) Applicant: DAIHEN Corporation, Osaka-shi, Osaka (JP)

(72) Inventor: Junzo Fujii, Osaka (JP)

(73) Assignee: DAIHEN Corporation, Osaka (JP)

(*) Notice: Subject to any disclaimer, the term of this patent is extended or adjusted under 35 U.S.C. 154(b) by 439 days.

(21) Appl. No.: 15/541,818

(22) PCT Filed: Jan. 6, 2016

(86) PCT No.: PCT/JP2016/050199
§ 371 (c)(1),
(2) Date: Jul. 6, 2017

(87) PCT Pub. No.: WO2016/114186
PCT Pub. Date: Jul. 21, 2016

(65) Prior Publication Data
US 2018/0001413 A1    Jan. 4, 2018

(30) Foreign Application Priority Data

Jan. 13, 2015    (JP) .................................. 2015-004182

(51) Int. Cl.
*B23K 9/133*    (2006.01)
*B23K 9/173*    (2006.01)
*B65H 51/10*    (2006.01)

(52) U.S. Cl.
CPC ............ *B23K 9/1336* (2013.01); *B23K 9/133* (2013.01); *B23K 9/173* (2013.01); *B65H 51/10* (2013.01); *B65H 2701/36* (2013.01)

(58) Field of Classification Search
CPC ...... B23K 9/1336; B23K 9/133; B23K 9/173; B23K 9/124; B23K 9/12; B65H 51/10; B65H 2701/36

(Continued)

(56) References Cited

U.S. PATENT DOCUMENTS

| 2005/0016976 A1* | 1/2005 | Belfiore | B23K 9/124 |
| | | | 219/137.2 |
| 2012/0160897 A1* | 6/2012 | Enyedy | B21F 23/00 |
| | | | 228/8 |

FOREIGN PATENT DOCUMENTS

| JP | 58-119971 A | 8/1983 |
| JP | 4-134268 U | 12/1992 |

(Continued)

OTHER PUBLICATIONS

Search Report received in corresponding European Patent application, dated Sep. 5, 2018 (6 pages).

(Continued)

*Primary Examiner* — Phuong T Nguyen
(74) *Attorney, Agent, or Firm* — Hamre, Schumann, Mueller & Larson, P.C.

(57) ABSTRACT

The wire feed mechanism includes a feed roll, a pressure roll, a pressure arm, and a pressure mechanism. The feed roll rotates around a rotation axis. The pressure roll is displaceable relative to the feed roll. The pressure arm has a first end and a second end that are separate from each other, and rotatably supports the pressure roll. The pressure mechanism engages with the pressure arm so that a pressure force is applied from the pressure roll to the feed roll with a wire held between the feed roll and the pressure roll. A force-receiving portion is provided at an end of the pressure arm. When the pressure roll presses the feed roll, the pressure mechanism applies a force to the force-receiving portion in a direction that is substantially parallel to the direction in which the wire is fed.

7 Claims, 9 Drawing Sheets

(58) Field of Classification Search
USPC ... 219/137.7, 137.71, 137.72, 137.2, 137.31,
219/137.44, 137.51, 137.8, 138, 139, 140,
219/141, 142, 143, 144
See application file for complete search history.

(56) References Cited

FOREIGN PATENT DOCUMENTS

| | | |
|---|---|---|
| JP | 6-29772 U | 4/1994 |
| JP | 9-278283 A | 10/1997 |
| JP | 10-324458 A | 12/1998 |
| JP | 2010-99677 A | 5/2010 |

OTHER PUBLICATIONS

International Search Report issued in PCT/JP2016/050199, dated Mar. 29, 2016 (2 pages).

\* cited by examiner

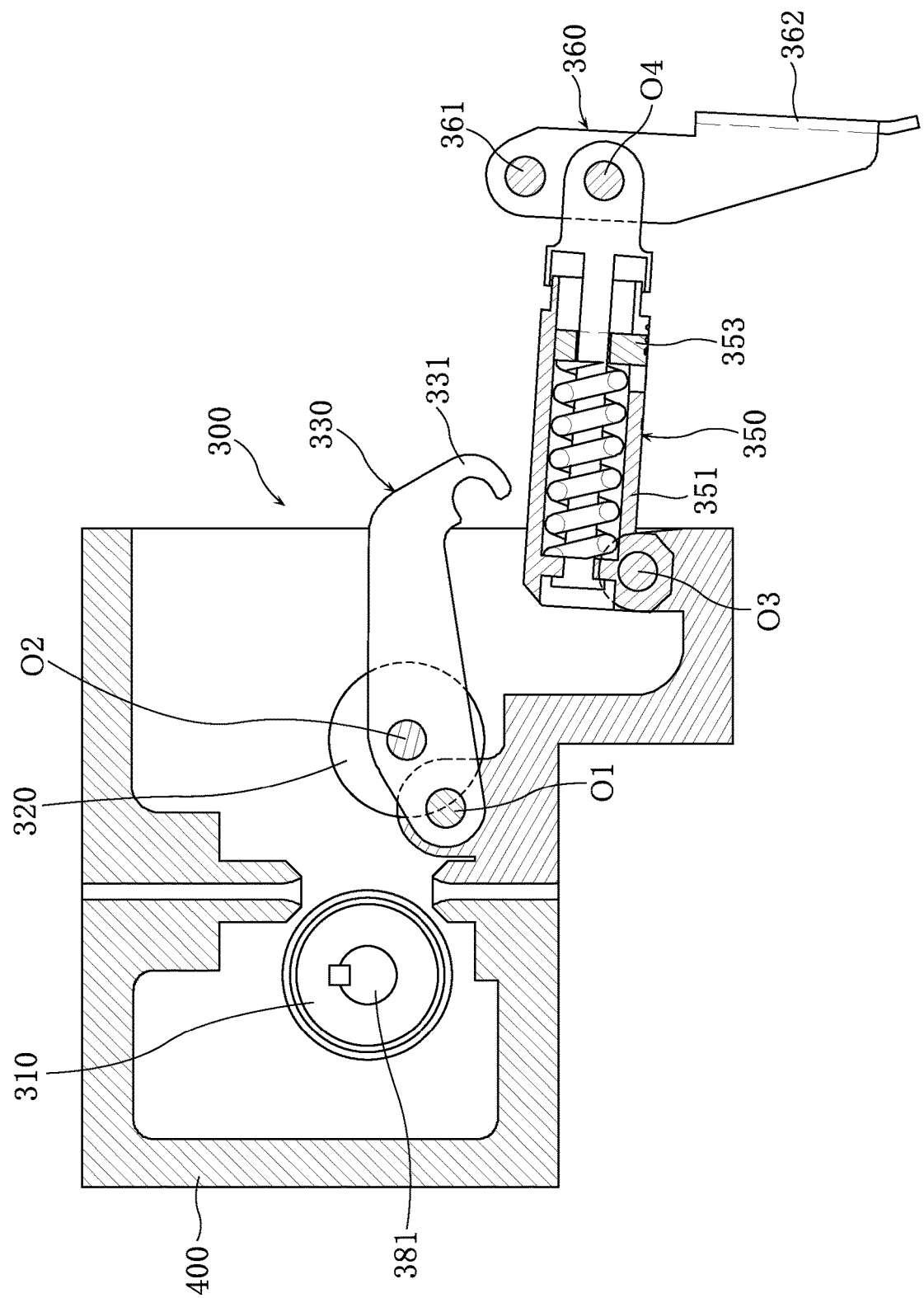

WIRE FEED MECHANISM

TECHNICAL FIELD

The present invention relates to a wire feed mechanism for feeding a welding wire.

BACKGROUND ART

Patent Document 1 discloses a welding wire feeder. The wire feeder disclosed in this document includes a feed roll and a pressure roll. The feed roll and pressure roll rotate with a welding wire held therebetween. The welding wire is thus fed in a desired direction. Specifically, the pressure roll is attached to a pressure holder, and a base end of the pressure holder is pivotably supported by the feeder body. Meanwhile, a lever portion is provided at a front end of the pressure holder. As a result of this lever portion being pressed by a pressure means (pressure handle), the welding wire is held between the feed roll and pressure roll.

With the above-described conventional wire feeder, the lever portion of the pressure holder can be released by tilting the pressure handle from a given position. In this state, maintenance, such as replacement of the welding wire and the pressure roll, can be performed. On the other hand, when the lever portion of the pressure holder is in a state of being pressed by the pressure handle, the pressure handle extends in a direction that is substantially perpendicular to the wire feed direction. Unfavorably, such pressure handle configuration may be a factor that hinders a reduction in the size of the wire feeder.

PRIOR ART DOCUMENTS

Patent Document

Patent Document 1: JP 2010-99677A

SUMMARY OF THE INVENTION

Problems to be Solved by the Invention

The present invention has been made in view of the foregoing situation, and a main object thereof is to provide a wire feed mechanism that is suitable for a size reduction.

Means for Solving the Problem

To achieve the above-stated object, the present invention employs the following technical means.

A wire feed mechanism provided by an embodiment includes: a feed roll that rotates around a rotation axis; a pressure roll that is displaceable relative to the feed roll; a pressure arm having a first end and a second end that are separate from each other, where the pressure arm rotatably supports the pressure roll; and a pressure mechanism that engages with the pressure arm so that a pressure force is applied from the pressure roll to the feed roll with a wire held between the feed roll and the pressure roll. The pressure arm is pivotable around a first shaft that is located at the first end and parallel to the rotation axis. The pressure arm includes a force-receiving portion provided at the second end. When the pressure roll presses the feed roll, the pressure mechanism applies a force to the force-receiving portion in a direction that is substantially parallel to a direction in which the wire is fed.

Preferably, the pressure roll is rotatable around a second shaft that is parallel to the rotation axis, and the second shaft is located closer to the first shaft than to the force-receiving portion.

Preferably, the pressure mechanism includes a first structural portion and a second structural portion supported by the first structural portion. The first structural portion is located on a side opposite to the feed roll relative to the first shaft, and pivotable around a third shaft that is parallel to the rotation axis. The second structural portion is supported by the first structural portion so as to be pivotable around a fourth shaft, and has a pressing force portion that engages with the force-receiving portion. The pressing force portion is provided by a pin, for example.

Preferably, the distance from the third shaft to the fourth shaft is greater than the distance from the fourth shaft to the pressing force portion. The second structural portion has an operation portion that extends toward a side opposite to the pressing force portion relative to the fourth shaft.

Preferably, the pressure mechanism includes a biasing member that is provided in the first structural portion. When the pressure roll presses the feed roll, the biasing member applies a biasing force in a direction moving from the fourth shaft toward the pressing force portion.

Preferably, the wire feed mechanism further includes an adjustment mechanism for adjusting the force applied to the force-receiving portion by the pressure mechanism.

Preferably, the wire feed mechanism further includes a motor having a rotation shaft. The feed roll is fixed to the rotation shaft.

Other features and advantages of the present invention will be more apparent through the following detailed description with reference to the accompanying drawings.

BRIEF DESCRIPTION OF THE DRAWINGS

FIG. 9 is a diagram for illustrating an operation procedure at the time of performing maintenance of the wire feed mechanism.

MODE FOR CARRYING OUT THE INVENTION

Preferable embodiments of the present invention will be described below with reference to the drawings.

Figure 1:
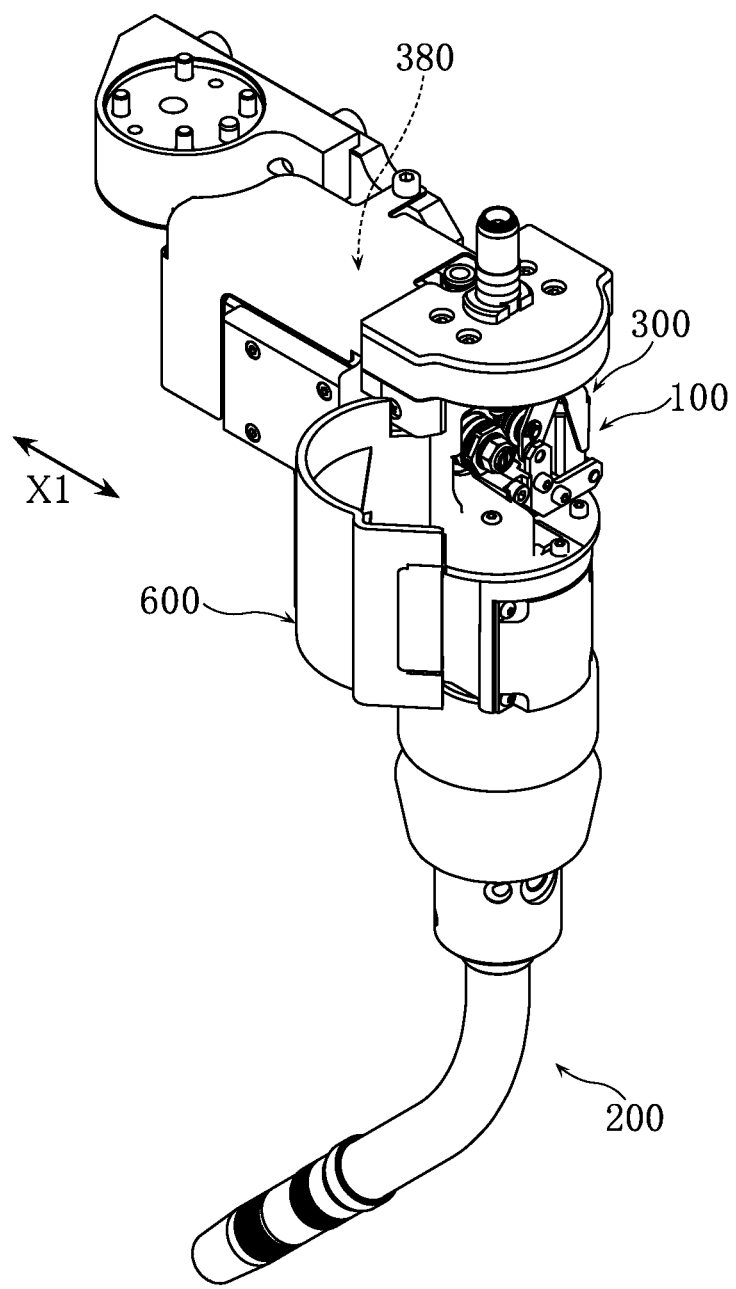
FIG. 1 is an overall perspective view showing an exemplary configuration in which a feeder, in which a wire feed mechanism according to an embodiment is incorporated, is attached to a welding torch.
Figure 2:
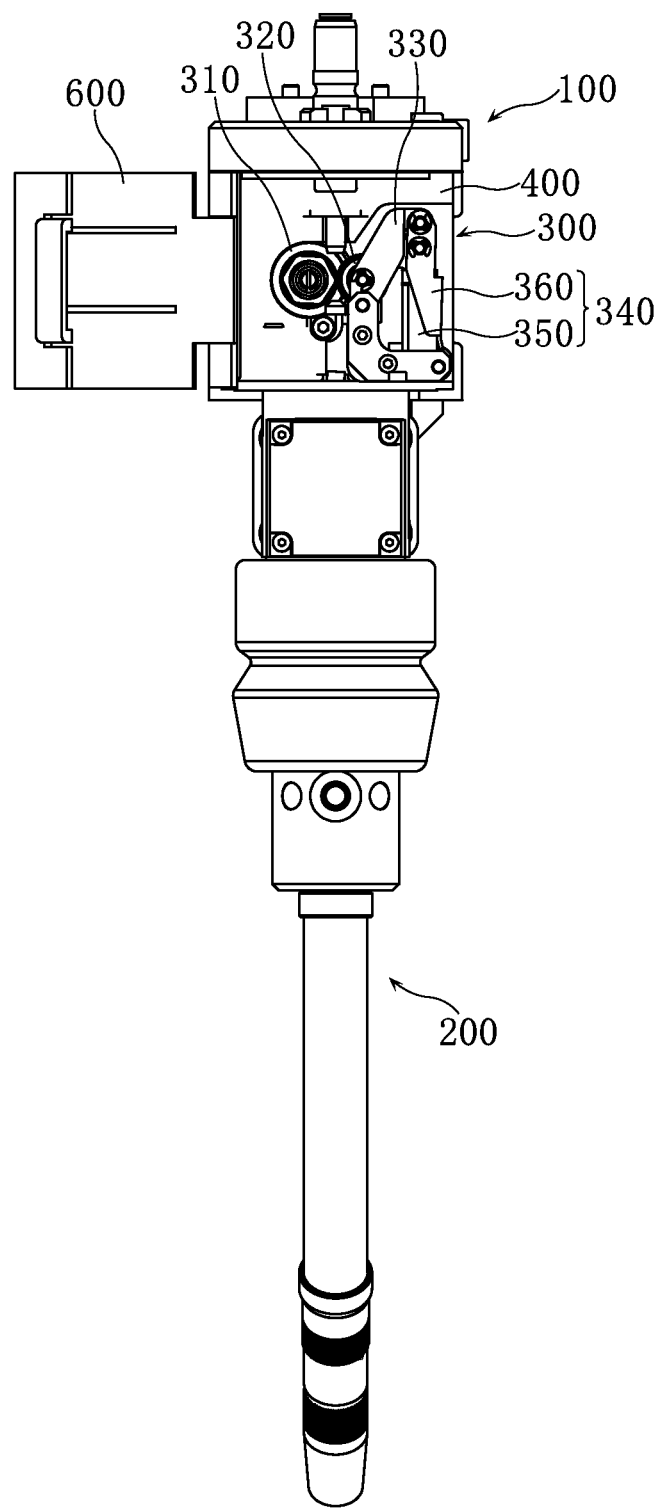
FIG. 2 is a front elevational view of the configuration shown in FIG. 1.

FIG. 1 is a perspective view showing a welding torch 200 that includes a feeder 100, in which a wire feed mechanism according to an embodiment is incorporated. FIG. 2 is an elevational view of the welding torch 200. For example, the welding torch 200 is attached to a wrist portion of a manipulator that is configured as a multi-joint robot constituted by a plurality of arms, and is used to perform automatic welding, such as consumable electrode gas shield arc welding. A welding wire (hereinafter referred to simply as a "wire") is fed to the welding torch 200 via a given cable (e.g. a conduit cable or a power cable etc.). Specifically, a power supply chip is provided within the welding torch 200 on the leading end side thereof. The wire is fed within the welding torch 200 toward the power supply chip by the feeder 100, and is then sent to the outside from an opening at the leading end of the welding torch 200. Electric power and a shield gas are supplied to the welding torch 200. For example, electric power is supplied from a power supply device via a power cable, and is supplied to a wire via the power supply chip. For example, the shield gas is supplied from a gas cylinder, flows within the welding torch 200, and is then ejected to the outside from the opening at the leading end of the welding torch 200.

Figure 3:
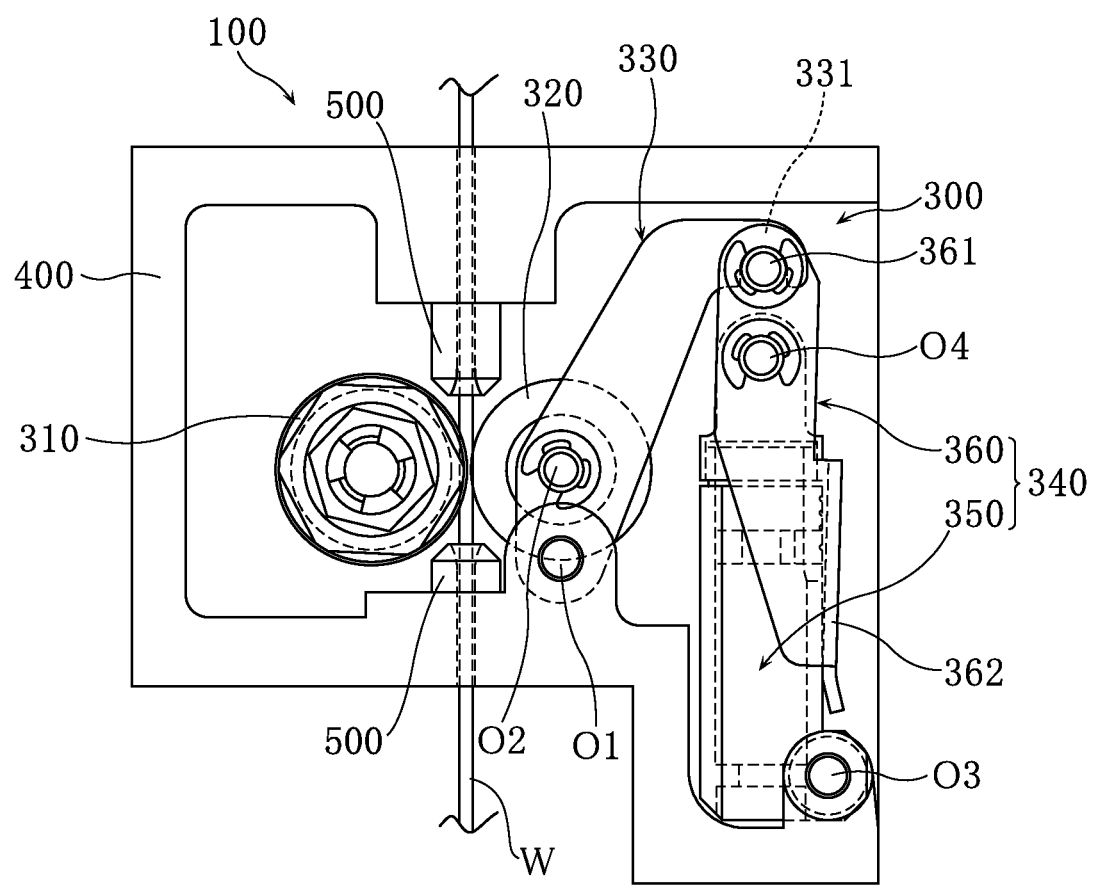
FIG. 3 is an enlarged elevational view showing a schematic configuration of the wire feed mechanism.

The feeder 100 is attached to the base end of the welding torch 200. As shown in FIGS. 2 and 3, the feeder 100 includes a wire feed mechanism 300, a frame 400 for supporting the wire feed mechanism 300, a wire guide 500, and a cover 600.

The frame 400 is made of a metal, for example. In an embodiment, the frame 400 has a bottom plate and side plates that are installed upright on this bottom plate, and a given internal space is formed by these plates.

As shown in FIG. 3, the wire guide 500 is provided within the frame 400. The wire guide 500 guides a wire W, which is supplied via a cable not shown in the diagram. Specifically, a hole for causing the wire W to pass through is formed in the wire guide 500. With this configuration, the wire guide 500 appropriately guides the wire W that has been supplied via the aforementioned cable to the outside of the feeder 100. The wire W that has passed through the feeder 100 is sent to the leading end of the welding torch 200 through the inside of the welding torch 200.

Figure 4:
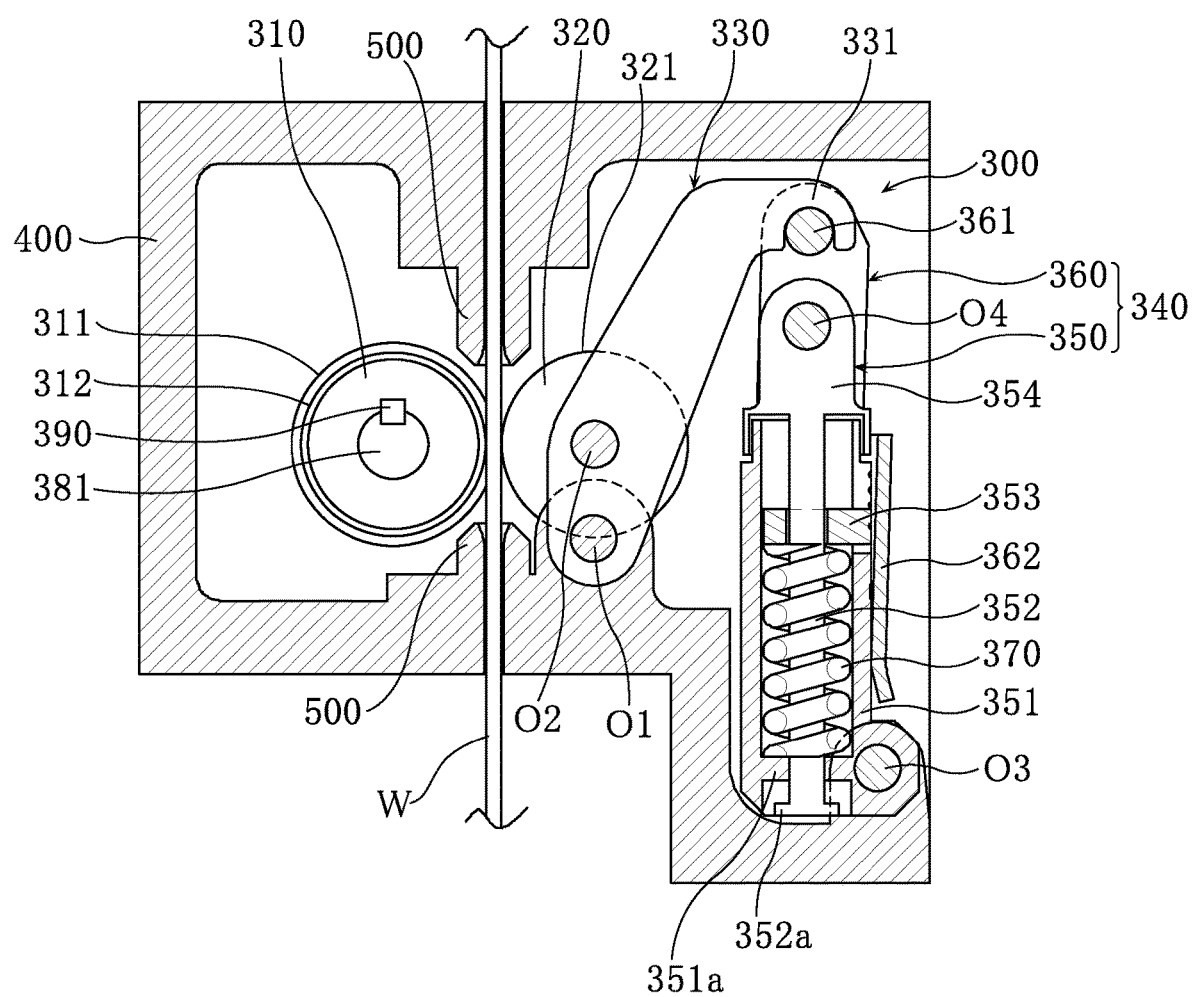
FIG. 4 schematically shows a lateral cross-section of a part of the wire feed mechanism.

As shown in FIGS. 3 and 4, the wire feed mechanism 300 includes a feed roll 310, a pressure roll 320, a pressure arm 330, a pressure mechanism 340, and a motor 380 (see FIG. 1). The feed roll 310, pressure roll 320, pressure arm 330, and pressure mechanism 340 are supported by the frame 400, and are accommodated in the internal space of the same frame. Note that FIGS. 1 and 2 show a state where the cover 600 is open. With the cover 600 closed, the feed roll 310, pressure roll 320, pressure arm 330, and pressure mechanism 340 are covered by the cover 600.

The feed roll 310 and pressure roll 320 cooperate with each other to send out the wire W in a desired direction. In this embodiment, the feed roll 310 is fixed to a rotation shaft 381 of the motor 380. The shaft 381 extends parallel to a first direction X1 (see FIG. 1), and rotates around an axis parallel to this direction. With the rotation of the shaft 381, the feed roll 310 also rotates around the same axis.

A groove 312 for guiding the wire W is formed in an outer circumferential face 311 of the feed roll 310. The groove 312 is open radially outward relative to the axis of the shaft 381. The groove 312 is recessed inward of the outer circumferential face 311 of the feed roll 310.

The pressure roll 320 is arranged on the side opposite to the feed roll 310 relative to the wire W. In this embodiment, the pressure roll 320 is rotatably supported by the pressure arm 330. Specifically, the pressure arm 330 is supported by the frame 400 so as to be pivotable around a first shaft O1. Meanwhile, the pressure roll 320 is configured to rotate around a second shaft O2, which is attached to the pressure arm 330. The first shaft O1 and second shaft O2 extend parallel to the first direction X1.

The outer circumferential face 321 of the pressure roll 320 faces radially outward of the axis of the second shaft O2. The outer circumferential face 321 of the pressure roll 320 can approach and move away from the outer circumferential face 311 of the feed roll 310. The wire W is fed as a result of the feed roll 310 (and also the pressure roll 320, which serves as a follower roll) rotating with the wire W held between the outer circumferential face 321 of the pressure roll 320 and the groove 312 of the feed roll 310. Note that a configuration may be employed in which a groove is formed in the outer circumferential face of the pressure roll 320, and the wire W is held between this groove and the groove 312 of the feed roll 310.

The rotational direction of the pressure roll 320 is opposite to the rotational direction of the feed roll 310. As the feed roll 310 rotates with the pressure roll 320 and feed roll 310 holding the wire W therebetween, a frictional force is exerted from the feed roll 310 to the wire W, and the wire W is fed. In this embodiment, the wire W is fed in a downward direction in FIG. 3.

As mentioned above, the pressure arm 330 is pivotably supported by the frame 400 via the first shaft O1. The first shaft O1 is located on the base end side of the pressure arm 330. A force-receiving portion 331 is provided in the pressure arm 330 on the leading end side thereof. The force-receiving portion 331 is a portion for receiving a force from the later-described pressure mechanism 340 (second structural portion 360) through a pressing force portion 361 of the pressure mechanism 340. In this embodiment, the pressing force portion 361 has a groove shape.

As mentioned above, the second shaft O2 for supporting the pressure roll 320 is attached to the pressure arm 330. The second shaft O2 is located between the first shaft O1 of the pressure arm 330 and the force-receiving portion 331, and is located closer to the first shaft O1 than to the force-receiving portion 331.

The pressure mechanism 340 (see FIGS. 3 and 4) is for generating a force that acts from the pressure roll 320 toward the feed roll 310 by driving the pressure arm 330. In this embodiment, the pressure mechanism 340 includes a first structural portion 350 and a second structural portion 360 that is supported by this first structural portion 350.

The first structural portion 350 (see FIG. 4) includes a case 351, a shaft 352, a nut 353, and a joint 354. The shaft 352 is provided within the case 351, and can move in the axial direction (longitudinal direction) of the case 351. A locking portion 352a is provided at a base end of the shaft 352, and a locked portion 351a is provided at a base end of the case 351. In this embodiment, the locking portion 352a has a flange shape that projects perpendicular to the longitudinal direction of the shaft 352. As is clear from FIGS. 5 and 6, for example, movement of the shaft 352 toward the leading end side of the case 351 is restricted as a result of the locking portion 352a being locked at the locked portion 351a. A biasing member 370 is fitted onto the shaft 352. In this embodiment, the biasing member 370 is a coil spring in a state of being compressed relative to its natural length.

A thread portion is formed on the shaft 352 on the leading end side thereof, and the nut 353 is screwed with this screw portion. A main portion of the nut 353 is arranged within the case 351. The nut 353 cannot rotate relative to the case 351, but can move in the axial direction. The joint 354 is fixed to the leading end of the shaft 352. As is understood from FIGS. 4, 5, and so forth, the joint 354 and shaft 352 can be moved in the axial direction by a given stroke. As will be described later (see FIG. 8), upon rotating the joint 354 using an operation portion 362 of the second structural portion 360, the shaft 352 rotates therewith. One end of the biasing member 370 is in contact with the nut 353, and the other end is in contact with the locked portion 351a of the case 351. Upon the shaft 352 rotating, the nut 353 approaches or move away from the locked portion 351a of the case 351, depending on the rotational direction of the shaft 352. The overall length of the biasing member 370 thus changes, and the magnitude of the force exerted by the biasing member 370 can be thus adjusted.

The case 351 (first structural portion 350) is pivotably supported by the frame 400. Specifically, the case 351 pivots around a third shaft O3. The third shaft O3 is located at a base end of the case 351 (first structural portion 350), and extends parallel to the first direction X1.

The third shaft O3 is located on the side opposite to the feed roll 310 relative to the wire W. The third shaft O3 is located farther from the wire W than is the first shaft O1.

The second structural portion 360 has a generally elongated shape, and has the pressing force portion 361 and the operation portion 362. The pressing force portion 361 is provided at one end (first end) of the second structural portion 360, and the operation portion 362 is provided at the other end (second end). In this embodiment, the pressing force portion 361 is a pin, and is configured to engage with the force-receiving portion 331 of the pressure arm 330 (see FIGS. 4, 5, and so forth).

The second structural portion 360 is pivotably supported by the first structural portion 350. Specifically, the second structural portion 360 pivots around a fourth shaft O4. The fourth shaft O4 is located close to the first end of the second structural portion 360, and extends parallel to the first direction X1. In this embodiment, the fourth shaft O4 is located in the joint 354 of the first structural portion 350, i.e. at the leading end of the first structural portion 350. The operation portion 362 extends toward the side opposite to the pressing force portion 361 relative to the fourth shaft O4.

The distance from the third shaft O3 to the fourth shaft O4 is greater than the distance from the fourth shaft O4 to the pressing force portion 361.

The motor 380 (see FIG. 1) is for rotating the feed roll 310. The motor 380 is fixed to the base end of the welding torch 200. As shown in FIG. 4, the feed roll 310 is fitted onto a shaft 381 of the motor 380. In this embodiment, grooves are formed in an outer circumferential face of the shaft 381 and an inner circumferential surface of the feed roll 310, and the same key material 390 is fitted into these grooves. The feed roll 310 is thus directly fixed to the shaft 381 of the motor 380.

Next, effects of the present embodiment will be described.

In this embodiment, the pressure arm 330 is pivotable around the first shaft O1, and the force-receiving portion 331 is provided at the leading end thereof. As shown in FIG. 4, when the pressure roll 320 presses the feed roll 310 with the pressure roll 320 and feed roll 310 holding the wire W therebetween, the biasing member 370 (compressed coil spring) assumes a posture extending substantially parallel to the direction in which the wire W is fed. The force-receiving portion 331 then receives, from the biasing member 370 (pressure mechanism 340), a force in a direction that is substantially parallel to the direction in which the wire W is fed (in an upward direction in FIG. 4). With this configuration, the entire pressure mechanism 340 can be arranged close to the wire W. This contributes to a reduction in the size of the wire feed mechanism 300.

The pressure roll 320 is attached to the second shaft O2, and the second shaft O2 is located closer to the first shaft O1 than to the force-receiving portion 331 of the pressure arm 330. With this configuration, the pressure roll 320 can be appropriately pressed against the feed roll 310 due to the force received by the force-receiving portion 331 from the pressure mechanism 340. This contributes to a reduction in the size of the wire feed mechanism 300.

FIGS. 5 to 9 show an operation procedure at the time of performing maintenance, such as replacement, of the pressure roll 320 and the feed roll 310.

As mentioned above, the pressure mechanism 340 includes the first structural portion 350 and the second structural portion 360. The first structural portion 350 is configured to pivot around the third shaft O3, and the biasing member 370 is provided therewithin. The second structural portion 360 is supported so as to be pivotable around the fourth shaft O4 relative to the first structural portion 350, and includes the pressing force portion 361 for applying a force to the force-receiving portion 331 of the pressure arm 330. With this configuration, transmission of the biasing force applied by the biasing member 370 can be interrupted by pivoting the second structural portion 360 in the arrow direction in FIG. 5 from the state shown in FIG. 4.

The distance from the third shaft O3 to the fourth shaft O4 is greater than the distance from the fourth shaft O4 to the pressing force portion 361. The second structural portion 360 includes the operation portion 362 that extends to the side opposite to the pressing force portion 361 relative to the fourth shaft O4. With this configuration, the expansion/contraction stroke of the biasing member 370 provided in the first structural portion 350 can be secured. In addition, a pivot operation force of the operation portion 362 can be amplified to be transmitted to the pressing force portion 361. With this configuration, an operation required to interrupt or transmit the force of the pressure mechanism 340 can be readily performed.

Figure 5:
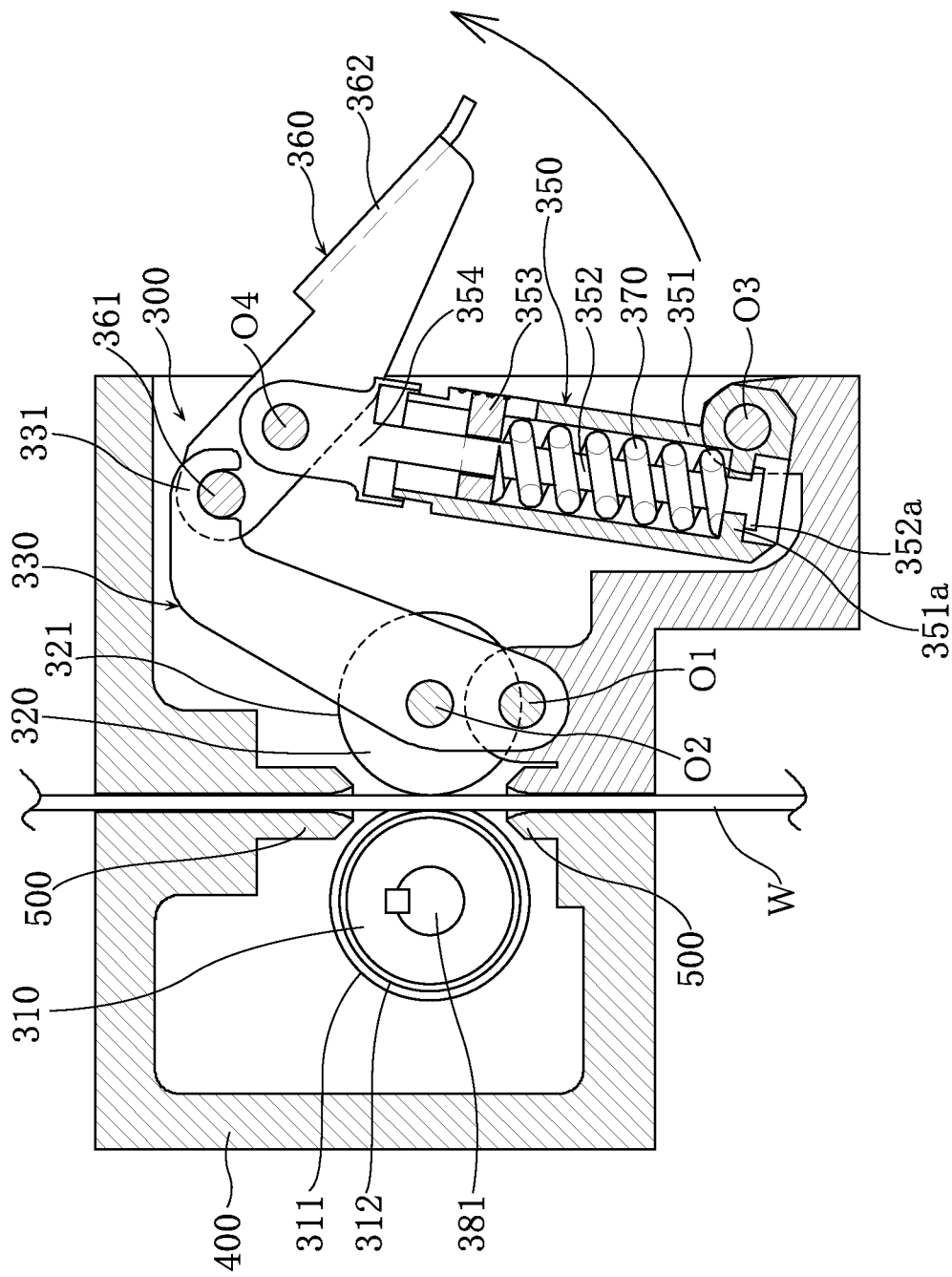
FIG. 5 is a diagram for illustrating an operation procedure at the time of performing maintenance of the wire feed mechanism.
Figure 6:
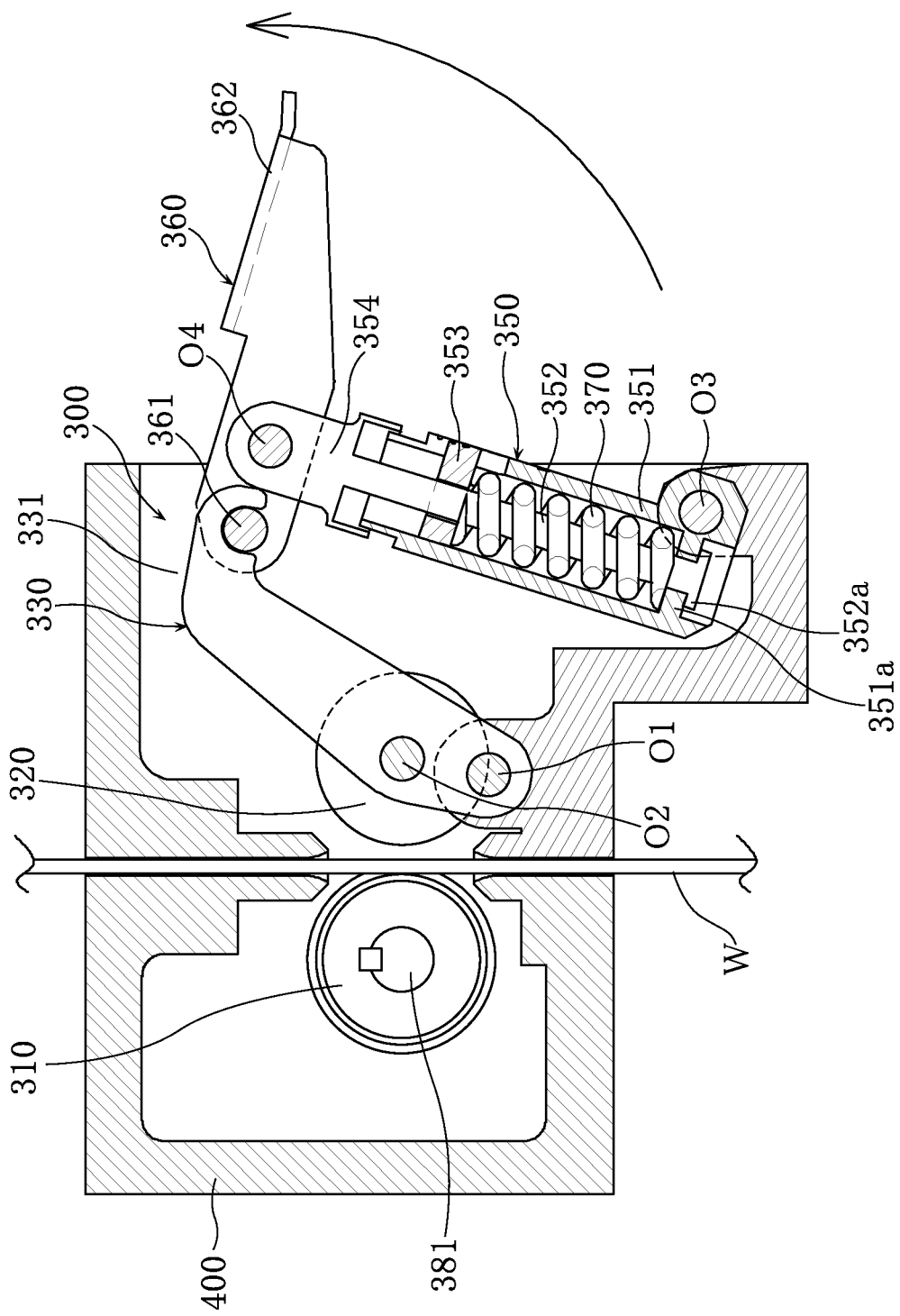
FIG. 6 is a diagram for illustrating an operation procedure at the time of performing maintenance of the wire feed mechanism.
Figure 7:
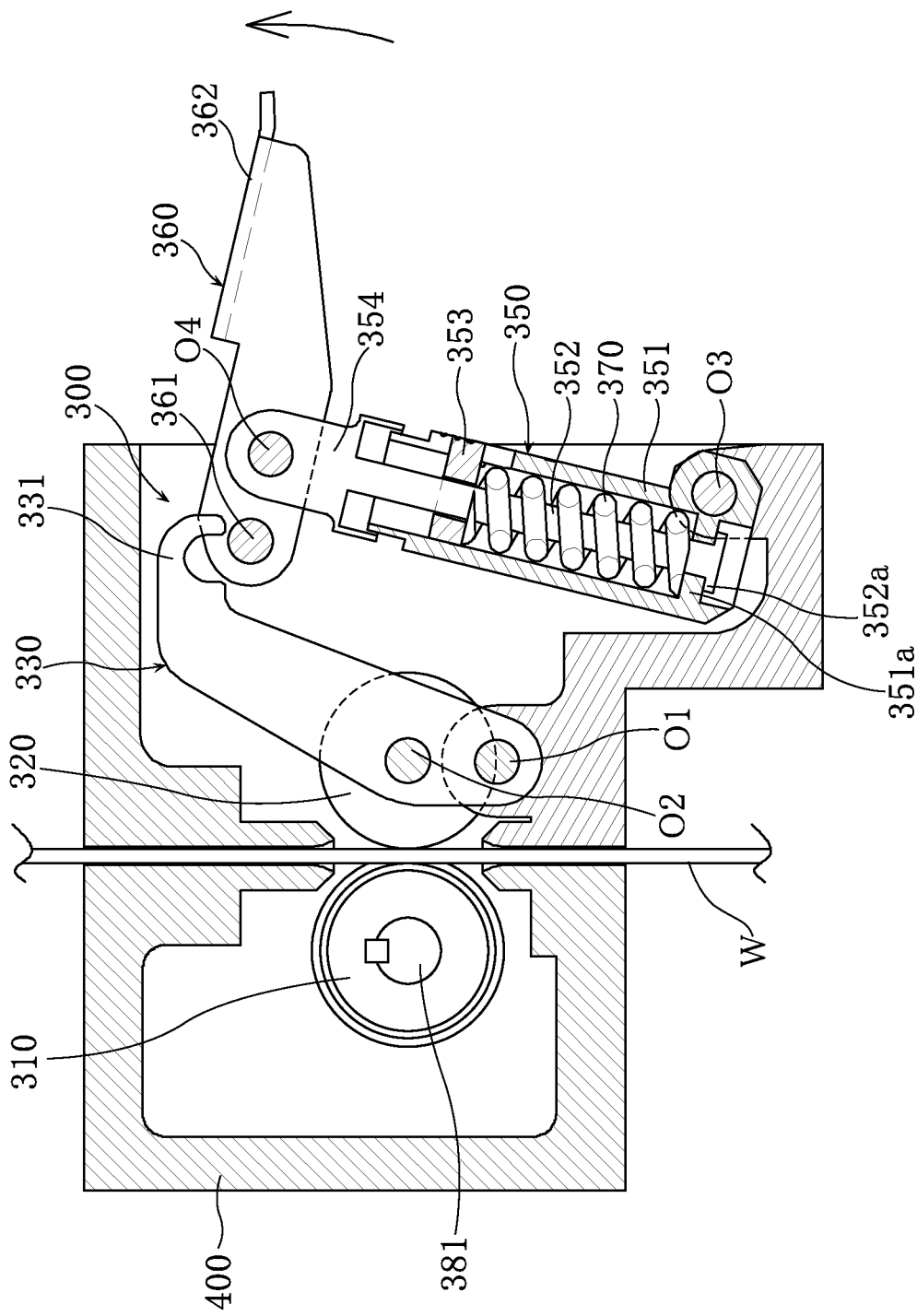
FIG. 7 is a diagram for illustrating an operation procedure at the time of performing maintenance of the wire feed mechanism.
Figure 8:
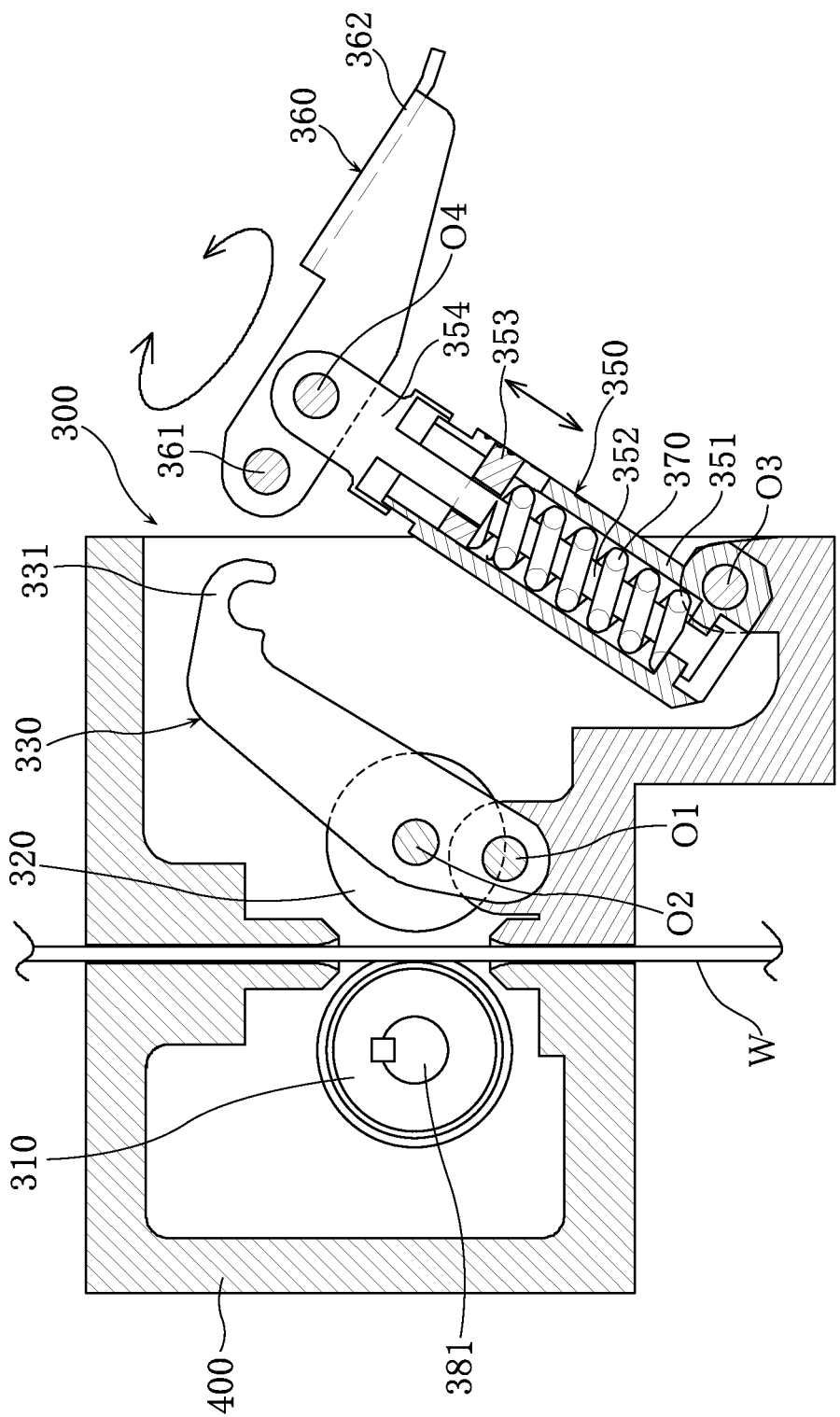
FIG. 8 is a diagram for illustrating an operation procedure at the time of performing maintenance of the wire feed mechanism.

FIG. 6 shows a state where the operation portion 362 (second structural portion 360) has been further pivoted in the arrow direction from the state shown in FIG. 5. In the state shown in FIG. 6, the pressure arm 330 has pivoted around the first shaft O1 in the direction moving away from the wire W (clockwise), and the pressure roll 320 has moved away from the wire W, compared with the state shown in FIG. 5. Upon the second structural portion 360 being further pivoted in the arrow direction as shown in FIG. 7, the pressing force portion 361 is detached from the force-receiving portion 331. Then, by pivoting the first structural portion 350 around the third shaft O3 (clockwise) as shown in FIG. 8, the second structural portion 360 can be brought into a state of being completely separate from the pressure arm 330. As shown in FIG. 8, upon the second structural portion 360 being rotated around the axis of the shaft 352, the second structural portion 360 rotates together with the joint 354, and the nut 353 moves in the axial direction of the shaft 352. If the nut 353 moves, the overall length (compressed length) of the biasing member 370 changes. For example, if the overall length of the biasing member 370 is shortened (compressed), the elastic restoring force of the biasing member 370 increases. As understood from comparison with the state in FIG. 4, in a state where the force exerted from the pressure roll 320 toward the feed roll 310 is applied, the shaft 352 and joint 354 move in the axial direction to the base end side of the case 351 by a given length, and the biasing member 370 is further compressed by the given length. As a result, the force received by the force-receiving portion 331 increases. By thus changing the position of the nut 353 relative to the shaft 352, the magnitude of the force received by the force-receiving portion 331 from the pressure mechanism 340 can be thus adjusted. Then, by adjusting the force received by the force-receiving portion 331, the force applied from the pressure roll 320 to the feed roll 310 via the pressure arm 330 can be adjusted. As a result, an appropriate pressure force can be applied to the wire W even in the case of changing the material or diameter of the wire W to be used.

As described above, in this embodiment, the force received by the force-receiving portion 331 can be adjusted by a simple operation to rotate the second structural portion 360. In this embodiment, a force adjustment mechanism is realized by a configuration that includes the shaft 352, nut 353, and joint 354. In an embodiment, a scale may be provided in the case 351, for example, in the direction in which the nut 353 moves. This scale facilitates understanding of the amount of movement of the nut 353, and enables accurate adjustment of the pressure force.

As shown in FIG. 9, when the pressure roll 320 and the feed roll 310 are replaced, the first structural portion 350 is pivoted around the third shaft O3, and the pressure arm 330 is also pivoted around the first shaft O1. The first structural portion 350 and the pressure arm 330 can be thus sufficiently separated from the wire W in a direction that intersects the first direction X1. Accordingly, a large work space for replacing these rolls can be secured.

Although various embodiments have been described above, the invention is not limited to the above embodiments. Any change within the scope of claims is encompassed in the scope of the present invention.

DESCRIPTION OF SIGNS

100 Feeder
200 Welding torch
300 Wire feed mechanism
310 Feed roll
311 Outer circumferential face
312 Groove
320 Pressure roll
321 Outer circumferential face
330 Pressure arm
331 Force-receiving portion
340 Pressure mechanism
350 First structural portion
351 Case
351a Locked portion
352 Shaft
352a Locking portion
353 Nut
354 Joint
360 Second structural portion
361 Pressing force portion
362 Operation portion
370 Biasing member
380 Motor
381 Shaft (of the motor)
390 Key material
400 Frame
500 Wire guide
600 Cover
O1 First shaft
O2 Second shaft
O3 Third shaft
O4 Fourth shaft
W Wire
X1 First direction

The invention claimed is:

1. A wire feed mechanism comprising:
a feed roll that rotates around a rotation axis;
a pressure roll displaceable relative to the feed roll;
a pressure arm having a first end and a second end that are separate from each other, the pressure arm rotatably supporting the pressure roll; and
a pressure mechanism that engages with the pressure arm so that a pressure force is applied from the pressure roll to the feed roll with a wire held between the feed roll and the pressure roll,
wherein the pressure arm is pivotable around an axis of a first shaft that is located at the first end and is parallel to the rotation axis, the pressure arm including a force-receiving portion provided at the second end, and
when the pressure roll presses the feed roll, the pressure mechanism applies the pressure force to the force-receiving portion in a direction that is parallel to a direction in which the wire is fed,
the pressure mechanism includes a first structural portion and a second structural portion supported by the first structural portion,
the first structural portion is located on a side opposite to the feed roll relative to the first shaft, the first structural portion being pivotable around an axis of a third shaft that is parallel to the rotation axis, and
the second structural portion is supported by the first structural portion so as to be pivotable around an axis of a fourth shaft relative to the first structural portion, the second structural portion having a pressing force portion that engages with the force-receiving portion.

2. The wire feed mechanism according to claim 1, wherein the pressure roll is rotatable around an axis of a second shaft that is parallel to the rotation axis, and the second shaft is located closer to the first shaft than to the force-receiving portion.

3. The wire feed mechanism according to claim 1, wherein a distance from the third shaft to the fourth shaft is greater than a distance from the fourth shaft to the pressing force portion, and
the second structural portion has an operation portion that extends toward a side opposite to the pressing force portion relative to the fourth shaft.

4. The wire feed mechanism according to claim 1, wherein the pressure mechanism includes a biasing member provided at the first structural portion, and
when the pressure roll presses the feed roll, the biasing member applies a biasing force in a direction moving from the fourth shaft toward the pressing force portion.

5. The wire feed mechanism according to claim 1, further comprising an adjustment mechanism for adjusting the force applied to the force-receiving portion by the pressure mechanism.

6. The wire feed mechanism according to claim 1, further comprising a motor having a rotation shaft, wherein the feed roll is fixed to the rotation shaft.

7. The wire feed mechanism according to claim 1, wherein the pressing force portion comprises a pin that engages with the force-receiving portion.

* * * * *